United States Patent [19]

Bjorklund et al.

[11] 4,198,162

[45] Apr. 15, 1980

[54] TUNABLE WIDE ANGULAR APERTURE FILTER BY DEGENERATE FOUR-WAVE MIXING

[75] Inventors: Gary C. Bjorklund, West Windsor; David M. Bloom, Holmdel; Paul F. Liao, Fair Haven, all of N.J.

[73] Assignee: Bell Telephone Laboratories, Incorporated, Murray Hill, N.J.

[21] Appl. No.: 908,779

[22] Filed: May 23, 1978

[51] Int. Cl.$^2$ .............................................. G01B 9/02
[52] U.S. Cl. .................................. 356/349; 356/28.5; 356/351
[58] Field of Search ............... 307/425; 356/28.5, 349, 356/345, 351

[56] References Cited

U.S. PATENT DOCUMENTS

| | | | |
|---|---|---|---|
| 3,409,369 | 11/1968 | Bickel | 356/349 X |
| 3,820,896 | 6/1974 | Stavis | 356/28.5 |
| 4,145,671 | 3/1979 | Hellwarth | 307/425 X |

OTHER PUBLICATIONS

Bloom, D. M. et al., "Observation of Amplified . . . ," Optics Letters, vol. 2, No. 3, Mar. 1978, pp. 58–60.
Jensen, S. M. et al., "Observation of Time Reversed . . . ," Applied Physics Letters, vol. 32, No. 3, Feb. 1978, pp. 166–168.
Bloom, D. M. et al., "Conjugate Wave-Front . . . ," Applied Physics Letters, vol. 31, No. 9, Nov. 1977, pp. 592–594.
Hellwarth, R. W., "Generation of Time Reversed . . . ," J. Opt. Sec. Am., vol. 67, No. 1, Jan. 1977, pp. 1–3.

Primary Examiner—John K. Corbin
Assistant Examiner—Scott J. Sugarman
Attorney, Agent, or Firm—Daniel D. Dubosky

[57] ABSTRACT

A wide angular aperture, tunable filter device is achieved by using degenerate four-wave mixing. The apparatus utilizes two counter-propagating pump beams at substantially the same frequency to interact with an object beam, containing a spread of frequency components through a third order nonlinearity in the susceptibility of a medium. This produces a conjugate image beam formed with frequency components close to the frequency of the pump beams. By tuning the frequency of the pump beams the object beam frequency spectrum may be scanned while preserving all of the spatial information in the object beam. Apparatus for generating velocity contours of moving objects is also disclosed.

12 Claims, 3 Drawing Figures

TUNABLE WIDE ANGULAR APERTURE FILTER BY DEGENERATE FOUR-WAVE MIXING

BACKGROUND OF THE INVENTION

This invention pertains to the field of wide angular aperture, tunable optical filters.

There is interest in producing narrow-band rapidly tunable filters. It is also desirable to have a filter that would allow scanning of object waves with 1cm$^{-1}$ resolution while preserving all of the spatial information in the object image. There is a need to provide filters for analyzing radiation from laser-target interactions where the object wave radiation is emitted in an intense pulse which is time synchronous to a master laser pulse. A further area of interest for filters occurs when filtering object waves have very low intensities. Narrow angular aperture filters aggravate the low intensity problem by their inability to utilize all of the light incident upon the filter. A further problem with interference filters is that the central frequency of the pass-band depends on the angle of incidence of the beam because this changes the pathlength of the light through the device.

SUMMARY OF THE INVENTION

In accordance with the present invention a tunable, wide angular aperture filter device is provided. The device operates by utilizing two counterpropagating pump beams at substantially the same frequency to interact with the object beam, containing a range of frequency components, in a medium having a third order nonlinearity in its susceptibility. A conjugate image beam is produced as a result of the degenerate four-wave mixing process in the medium which contains only those frequency components which are substantially equal to those contained in the pump beams and which contains all the spatial information of the object wave. The passband of the filter is changed by changing the frequency of the pump beams.

One feature of the invention is that the filter has a wide angular aperture which is only limited by beam overlap considerations.

Another feature of the invention is that the object beam does not have to be coherent light or collimated light.

Yet another feature of the invention is that the intensity of the conjugate image beam falls to one-half of its peak power when the frequency detuning between the object and pump beams is $\frac{1}{2}$Lcm$^{-1}$ (where L is the interaction length or length of overlap of the pump and object beams in the nonlinear medium). For example, an interaction length $\cong$1cm provides a frequency selectivity of approximately 1cm$^{-1}$.

Yet another feature of the invention is that it is possible to scan the object beam frequency spectrum with 1cm$^{-1}$ resolution while preserving all of the spatial information in the object image.

Yet another feature of the invention is that the conjugate image beam may be amplified by choosing the proper nonlinear medium.

Yet another feature of the invention is that the filter can be made to accept only a certain sense of circular polarization of the object beam and thus act as a polarization analyzer when used with certain materials, such as sodium which has an isotropic nonlinearity.

BRIEF DESCRIPTION OF THE DRAWING

A complete understanding of the present invention and of the above and other features thereof may be gained from a consideration of the following detailed description presented hereinbelow in connection with the accompanying diagram in which.

DETAILED DESCRIPTION OF THE DRAWING

Figure 1:
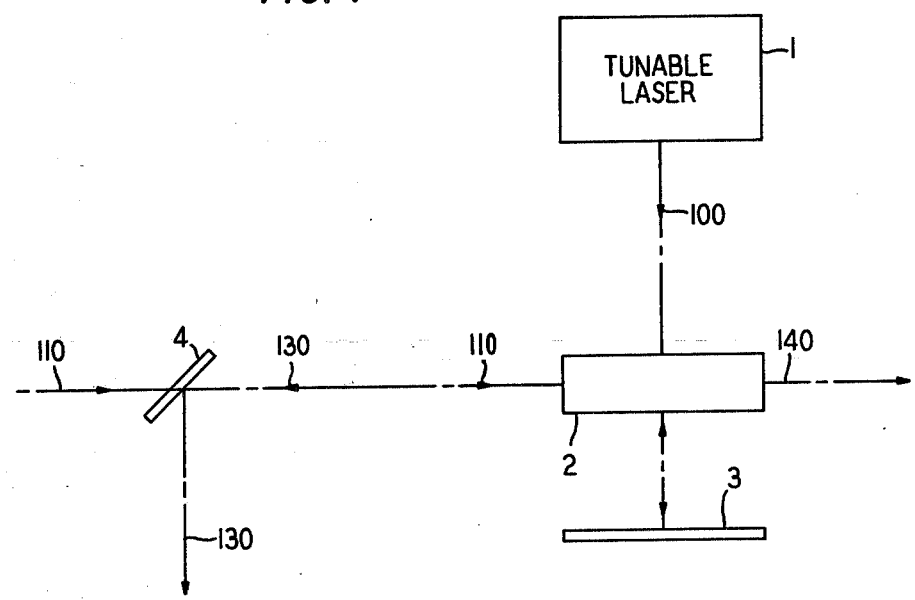
FIG. 1 shows in partially pictorial, partially schematic form an embodiment showing the principal of operation of the present invention.

The principal embodied in the present invention may be understood by referring to the filter shown in FIG. 1. Tunable laser 1 produces beam 100, which impinges on a material 2 having a third order nonlinearity in susceptibility. Beam 100 is retroreflected by mirror 3 to form counterpropagating pump beams within nonlinear medium 2. Object beam 110 passes through beamsplitter 4 and impinges on nonlinear medium 2. The degenerate four-wave mixing process, acting through the third order nonlinearity in the susceptibility of medium 2 causes conjugate beam 130 to be formed. Conjugate beam 130 is picked off for detection by beamsplitter 4. Beam 140 indicates the direction of that portion of the object beam which emerges from the interaction region in nonlinear medium 2.

The passband width of the filter depends on the type of nonlinear medium used. For example, nonlinear media with fast nonlinearities have passband widths which are determined by the phasematching condition for the four-wave mixing process. The four-wave mixing process provides that $$\omega_i = 2\omega_p - \omega_o, \quad (1)$$

where $\omega_i$ is the frequency of the conjugate image beam, $\omega_p$ is the frequency of the pump beams and $\omega_o$ is the frequency of the object beam. Let $\omega_o = \omega_p + \Delta$ where $\Delta$ is the detuning of the object beam from the pump. Using Eq. 1 we obtain $$\omega_i = \omega_p - \Delta. \quad (2)$$

This gives $$k_o = \omega_o/c = (\omega_p + \Delta)/c, \quad (3)$$

$$k_i = \omega_i/c = (\omega_p - \Delta)/c, \quad (4)$$

where $k_o$ and $k_i$ are the wave vectors for the object and conjugate image beams respectively and c is the velocity of light in the medium. The phasematching condition may be expressed as $$\left| \left( |\vec{k}_{p1} + \vec{k}_{p2} - \vec{k}_o| - \frac{\omega_i}{c} \right) \times L \right| \lesssim \pi, \quad (5)$$

where L is the interaction length in the nonlinear medium. Using Eqs. 3, 4 and 5, we obtain $$\Delta kL = \left(\frac{\omega_p + \Delta}{c} - \frac{\omega_p - \Delta}{c}\right) L \lesssim \pi. \quad (6)$$

Finally, we arrive at $$\Delta < c\pi/2L, \quad (7)$$

where $\Delta$ is the passband for materials having a fast nonlinearity.

Nonlinear media having a slow response have a passband which is inversely proportional to the smaller of the relaxation time or the pulse width of the pump beam.

Thus, in order to sharpen up the bandwidth for the filter, we can either choose a medium with a fast nonlinearity and use a relatively thick interaction length or we can choose a medium with a slow nonlinearity. The passband of a filter has been tested with both a ruby (a medium with a slow nonlinearity of ~4msec) and $CS_2$ (a medium with a fast nonlinearity of ~2 picoseconds) and both were in agreement with the description above.

We note that due to the fact that the pump beams are counterpropagating, the phasematching condition may be satisfied for any acceptance angle between the object and pump beams. Although the acceptance angle for the object beam is not limited by phasematching when the pump beams are counterpropagating, there are phasematching conditions which restrict the amount by which the acceptance angle of the pump beams may vary and still retain the benefits of degeneracy, i.e., substantially counterpropagating probe beams. This limit is derived from Eq. 5. If we consider the plane containing the pump beams and the object beam, the acceptance angle for pump beam divergence in this plane is $\delta\theta = \lambda/L$ when the probe and pump beams are orthogonal. The acceptance angle for pump bean divergence out of this plane is given by $\delta\theta = (\lambda/2L)^{\frac{1}{2}}$. However, if the probe beam is substantially aligned with the pump beams, then, the acceptance angle for divergence of the pump beams in the plane also reduces to $\delta\theta = (\lambda/2L)^{\frac{1}{2}}$.

Thus, in general any pair of pump waves collimated to their diffraction limit to a transverse dimension in each direction such as to maintain overlap of the beams over a length L will meet these acceptance angle requirements. This is important as it will allow utilization of lower power lasers to produce the necessary power densities to drive the four-wave mixing process.

The resultant narrow-band filter may have its passband rapidly tuned by tuning the frequency of the pump beams. It is also important to note that the conjugate image beam, while being filtered in frequency, has retained all the spatial information in the object wave. This aspect of the present invention will be described hereinafter in conjunction with a further embodiment shown in FIG. 2.

Figure 3:
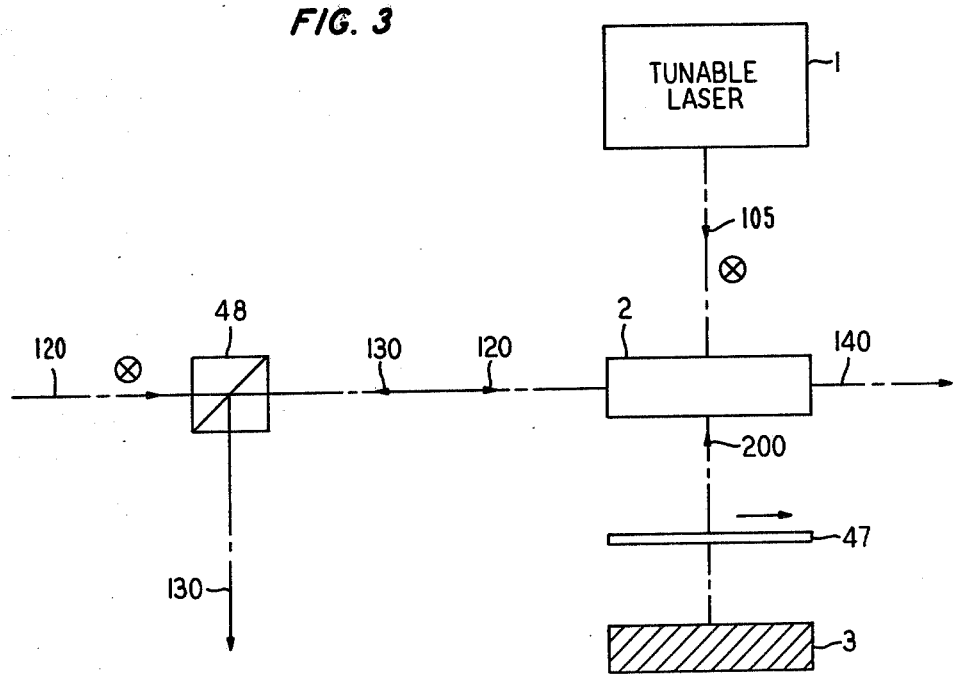
FIG. 3 shows in partially pictorial, partially schematic form an embodiment of the present invention using polarization flip of the object wave to improve the detection efficiency of the device.

Another embodiment of the present invention, shown in FIG. 3, provides for improved detection of the conjugate image wave when the object wave has a polarization in the same direction as one of the pump beams. Tunable laser 1 produces beam 5 with polarization into the plane of the figure. Beam 5 passes through nonlinear medium 2 and passes through quarter-wave plate 47. Beam 5 is retroreflected from mirror 3 and again passes through quarter-wave plate 47 to form beam 200. Beam 200 and beam 5 form counter-propagating pump beams within nonlinear medium 2, but the polarization of beam 200 has been rotated to be in the plane formed by the polarized object beam 120 and the counterpropagating beams 5 and 200. Object beam 120, having a polarization in the same direction as beam 5, passes through a polarizing beamsplitter 48 and impinges on nonlinear medium 2. The degenerate four-wave mixing process, acting through the third order nonlinearity of medium 2, causes conjugate beam 130 to be formed with the polarization of beam 200. Thus, object beam 120 has had its polarization flipped. Conjugate beam 130 is picked off for detection by polarizing beamsplitter 48. Beam 140 indicates the direction of that portion of the object beam which emerges from the interaction region in nonlinear medium 2. Since the polarization of beam 130 follows that of beam 200, beam 130 cannot be formed when beam 120 is exactly at right angles to the counterpropagating pumps. This embodiment is advantageous because the polarizer 48 is not as lossy a device as the beamsplitter detector 4 shown in FIG. 1. The nonlinear medium 2 in this embodiment would be atomic sodium vapor which is isotropic.

In order to produce a filter that would be polarization selective, one need only provide that beam 100 in FIG. 1 be circularly polarized by inserting a quarter wave plate in beam 100 before it impinges on nonlinear medium 2. Now both counterpropagating pump beams have opposite senses of circular polarization and a conjugate image beam is produced by degenerate four-wave mixing only when the object wave has polarization in the same sense as beam 100. The nonlinear medium in this embodiment would be atomic sodium vapor which is isotropic.

There are many situations in which one might wish to obtain the velocity contours of an object, for example, the flow of liquid or gas through a nozzle or the flow of a gas in a wind tunnel. The investigation is sensitive to velocity components which are parallel to the direction of the object beam. As discussed above, it is a requirement for degenerate four-wave mixing that both the pump beams and the object beam have substantially the same frequency. However, a moving object illuminated with light of the same frequency as the pump beams will not produce an image because the moving object will scatter light which has been Doppler shifted. The Doppler shift will change the frequency of the scattered light by an amount $\Delta\omega = \omega v/c$, where v is the velocity of the object. If the pump waves are produced by a separate radiation source, an image will be formed of all parts of the object which are moving with velocity $$v = (\omega_p - \omega)c/\omega, \quad (8)$$

where $\omega_p$ is the frequency of the pump and $\omega$ is the frequency of the radiation incident on the moving object.

By frequency modulating the pump beam, one can generate equally spaced frequency sidebands which produce a velocity control for each frequency sideband. Thus, the images formed will consist of contours, each one of which corresponds to parts of the object moving at the same velocity. Adjacent contour lines would correspond to separations in velocity of $\omega_m c/\omega_p$, where $\omega_m$ is the modulation frequency, $\omega_p$ is the center frequency of the pump waves and c is the velocity of light.

Multiple sidebands can be produced on a laser output in a number of ways by frequency modulation. One technique is to use a moving mirror as is shown in an embodiment of this aspect of the present invention in FIG. 2. Let $z(t)=z_0 \sin \omega_m t$ represent the translation of the mirror with respect to time, where $\omega_m$ is the modulation frequency.

$$v(t) = \dot{z}(t) = \omega_m z_0 \cos \omega_m t \qquad (9)$$

is the velocity of the mirror. The movement of the mirror introduces a phase variation in the light which is incident upon it of magnitude $2z(t)\omega_o/c$, where $\omega_o$ is the optical frequency. The frequency shift in the optical wave is given by the change of phase:

$$\Delta\omega(t) = \dot{\phi}(t) = 2\dot{z}(t)\frac{\omega_o}{c} = \frac{2\omega_o \omega_m}{c} z_0 \cos \omega_m t. \qquad (10)$$

Thus, the reflected beam has been frequency modulated and has multiple sidebands which may be used as has been described hereinabove as an element in a device which plots the velocity contours of a moving object. The characterization of the moving mirror in terms of a phase change enables one to find appropriate alternative methods of producing the modulation. For example, one may use an electro-optic phase modulator such as KDP to which an external, sinusoidal voltage has been applied to provide a phase variation by causing a change in the refractive index of light passing therethrough.

Figure 2:
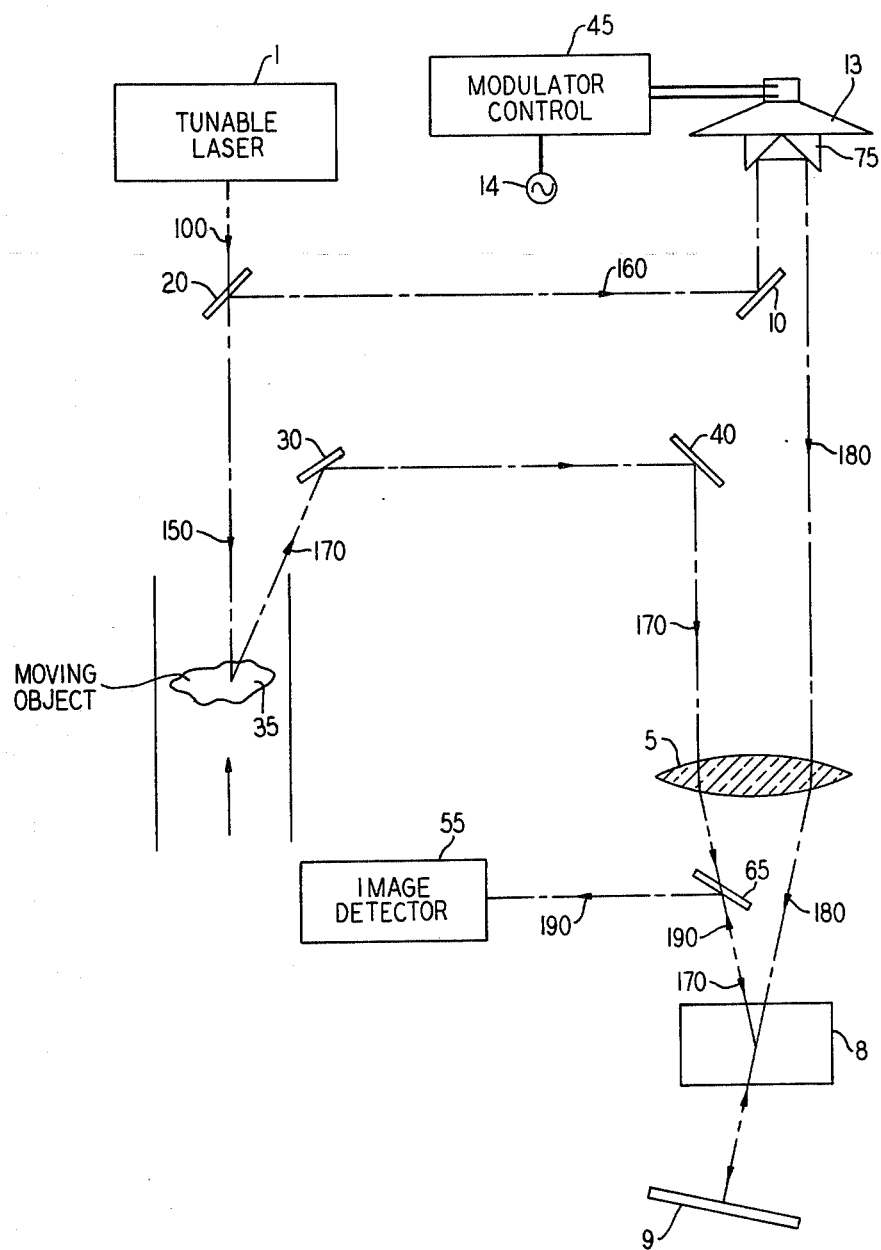
FIG. 2 shows in partially pictorial, partially schematic form an embodiment of the present invention which produces velocity contours of a moving object.

In FIG. 2, an embodiment of the present invention is shown which will map the velocity contours of a moving object. Laser source 1 produces beam 100 which impinges upon beamsplitter 20 to form beams 150 and 160. Beam 160 is reflected by reflector 10 so as to be reflected from corner cube 75 which in turn is affixed to speaker 13. An external voltage source 14 provides a sinusoidal drive to speaker 13 through a modulator control circuit 45. The signal applied to speaker 13 causes a translation of corner cube 75. The reflection of beam 160 from corner cube 75 forms beam 180 which now has been frequency modulated according to the modulation frequency of voltage source 14. Beam 180 is then focused by a lens 5.

Beam 150 is reflected from moving object 35 to form beam 170. Beam 170 is turn is reflected from reflectors 30 and 40 so as to enter lens 5 parallel to beam 180. Lens 5 focuses beams 170 and 180 to intersect in a non-linear medium 8. Beam 180 is reflected from a mirror 9 to form the counterpropagating pump beams in medium 8 that are necessary for the four-wave mixing process. Mirror 9 is tilted so that beam 180 is reflected back on itself. Beam 190, the conjugate image beam, propagates back along the direction of beam 170 and is picked off by a beamsplitter 65 and is detected in image detector 55.

The images detected will represent equal velocity contours of moving object 35. There will be a different contour for each of the sidebands introduced into beam 160 by translating corner cube 75. These contours may be used to study, for example, the flow of air over an airplane wing in a wind tunnel.

What is claimed is:

1. A wide angular aperture wavelength tunable optical filter for extracting selected wavelength components from an input image beam comprising:
   a medium having a third order nonlinearity in susceptibility;
   a laser source of tunable radiation having a range of wavelengths which includes the wavelengths to be selected from said input image beam and directed such that its output radiation passes through said medium;
   a reflector positioned so as to retroreflect radiation from said laser source after the radiation has passed through the medium thereby establishing counterpropagating pump beams in said medium, said medium being oriented so as to receive said input image beam; and
   means positioned in the path of said input image beam to extract a conjugate image beam generated in said medium wherein said input image beam and said counterpropagating pump beams spatially and temporally overlap.

2. An optical filter as defined in claim 1 wherein said means to extract a conjugate image beam is a beamsplitter.

3. An optical filter as defined in claim 1 wherein said filter further includes a quarter-wave plate positioned to intercept radiation between said reflector and said medium, and said means to extract a conjugate image beam is a polarizing beamsplitter.

4. A tunable optical filter as defined in claim 1 wherein said medium is $CS_2$.

5. A tunable optical filter is defined in claim 1 wherein said medium is an atomic sodium vapor.

6. A tunable optical filter as defined in claim 1 wherein said medium is a ruby crystal.

7. A device for obtaining a velocity contour of a moving object comprising:
   means for irradiating said moving object with a source beam of radiation having a source frequency;
   means for extracting a portion of said source beam;
   means for frequency modulating the portion of said source beam to form a modulated laser beam;
   means for generating substantially counterpropagating laser beams from said modulated laser beam;
   a medium having a third order nonlinearity in susceptibility positioned such that it is irradiated by said substantially counterpropagating laser beams;
   means for irradiating said medium with a probe beam of radiation obtained by reflection of said source beam from said moving object to form a conjugate image beam when said probe beam is substantially coincident spatially and temporally with said counterpropagating laser beams in said medium, said conjugate image beam containing a velocity contour of said moving object;
   means for detecting said conjugate image beam.

8. A device for obtaining a velocity contour of a moving object as defined in claim 7 wherein said means for frequency modulating a portion of said source beam includes an electrooptical crystal, and means for applying a sinusoidal voltage to said crystal.

9. A device for obtaining a velocity contour of a moving object as defined in claim 7 wherein said means for frequency modulating a portion of said source beam comprises a transducer, a mirror affixed to said transducer, and means for applying a sinusoidal signal to said transducer.

10. A device for obtaining a velocity contour of a moving object as defined in claim 7 wherein said medium is $CS_2$.

11. A device for obtaining a velocity contour of a moving object as defined in claim 7 wherein said medium is an atomic sodium vapor.

12. A device for obtaining a velocity contour of a moving object as defined in claim 7 wherein said medium is a ruby crystal.

* * * * *